E. LYNCH.

EVAPORATOR AND CONDENSER.

No. 194. Reissued Mar. 11, 1851.

UNITED STATES PATENT OFFICE.

EDWARD LYNCH, OF BROOKLYN, NEW YORK.

IMPROVEMENT IN EVAPORATORS AND CONDENSERS.

Specification forming part of Letters Patent No. 5,668, dated July 18, 1848; Reissue No. 194, dated March 11, 1851.

*To all whom it may concern:*

Be it known that I, EDWARD LYNCH, of Brooklyn, in the county of Kings and State of New York, have invented a new and Improved Condenser and Evaporator Combined; and I do hereby declare the following to be a full, clear, and exact description of the same, reference being had to the annexed drawings, making a part of this specification, in which—

Figure 3:
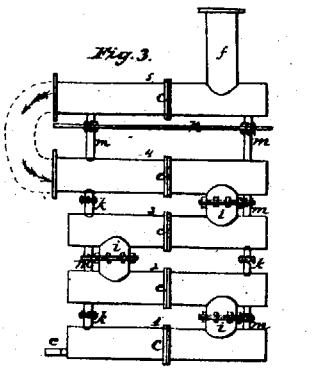
Figure 2:
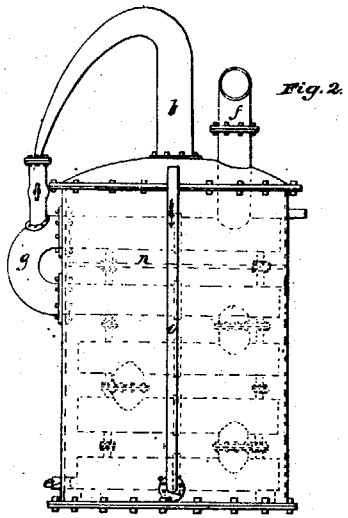
Figure 4:
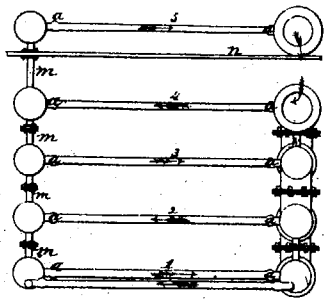
Figure 1:
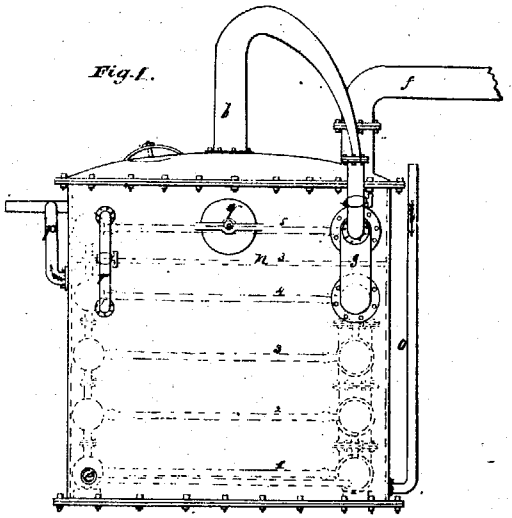
Figure 5:
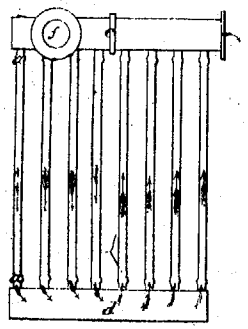

Figure 1 is a side elevation of the tank. Fig. 2 is an end elevation of the same. Fig. 3 is an end view of the tiers of pipes. Fig. 4 is a side view of the same, and Fig. 5 is a top view of one of the clusters.

My evaporator is so combined with the condenser that the vapor generated in the evaporator shall pass to the condenser to be condensed with the exhaust-steam for the purpose of supplying fresh water to the boiler in sufficient quantity to supply the waste.

In building my apparatus I prepare a number of metal tubes, which I prefer to be of copper, or like material, and small in size; and, to prepare for expansion, I bulge the pipes near each end, as seen at *a a*. I then take several pipes thus prepared and braze or otherwise insert their ends into the sides of two larger pipes or chambers, *c d*. The large pipe or chamber at *c* is divided in the center by a partition, so that no vapor can flow directly through it, and the pipe *d* has on its lower side two small openings for the insertion of two pipes, to be hereinafter more fully described. This forms a series of pipes, as seen in Fig. 5. I then take a number of forms thus made and attach them together, as seen in Figs. 3 and 4. In building them up all those cross-pipes or chambers which are divided at *c* must be laid one above the other. The lower cluster of pipes contains the exhaust-pipe *e*, while the upper one contains the injecting or steam pipe *f*. All these pipes connect by vertical pipes, except the top and second pipes on fourth and fifth clusters, which communicate by a bent pipe, *g*. The forms are connected with each other by two different-sized pipes, one of which is large and the other small. The large connecting-pipes are only inserted in the pipes *c* and these alternately on either side of the partition contained within it, as seen in Fig. 3, letter *i*, and at the opposite end of the same pipe is inserted a small pipe, *k*. The pipes *a* are connected in the tier by the small pipes *m*. The pipes are then incased within a proper tank, as seen in Figs. 1 and 2.

In placing the pipes in the tank the clusters 1 2 3 4 are first put in. This done, I divide the tank in two parts by inserting a partition-plate, *n*, within it, and on the top of this partition I put cluster No. 5. A cover is next put upon the tank, which contains several openings, one for the injection-pipe *f*, one for the evaporating-pipe *b*, and one for a man-hole. The other appendages to the tank are: *o*, feed-pipe for cold water; *p*, waste-pipe, (this pipe is inserted below the partition, but rises on the outside above it so as to have its discharge sufficiently high to cause the level of the water inside to be above the partition-plate *n* and pipes;) *q*, man-hole plate; *r*, pipe communicating with the tank above and below the partition. *e* is the exhaust-pipe.

The operation is as follows: A current of cold water is kept running through the tank by the pipes *o p*, the cold water entering in at the bottom of the tank and flowing out at the top, the cock in the pipe *r* being opened to allow the water to flow over the partition-plate *n* and the top cluster of pipes. Steam is now admitted into the pipe *f* through the exhaust-port from the cylinder. It passes along in the direction of the arrows to *d*, thence returning by the other half of the pipes to *c*, but enters the pipe *c* on the opposite side of the division-plate. From this plate the steam passes into the pipe *g*, and flows through the pipes in the order described until at the bottom it is completely condensed, and is pumped or otherwise taken off at *e*. The small pipes *k* are inserted for the purpose of removing the condensed water as fast as it accumulates in the pipes by a short passage to the exhaust-pipe, thus avoiding the necessity of conveying it through the pipes, affording at the same time always a clean surface to act upon the steam. It will be seen that the steam first passes through a cluster of pipes lying in that part of the tank cut off by the partition *n*, where the pipes are surrounded by a small quantity of water, and the steam acts upon this water at its highest temperature. This causes vapor to arise upon it, which vapor is carried off by the pipe *b* that connects with the bent pipe *g*, and flows from thence into the condensing-pipes, and is condensed along with the steam directly injected through *f* by means of the pipe *r*. The upper division of the tank is always kept supplied with water requisite for this purpose.

The use to which I propose to apply this apparatus is for the purpose of maintaining a full supply of fresh water for the generation of steam, where the water used would otherwise be salt or contain injurious impurities. The boiler in this case would be supplied in the first instance with pure water, and the tank or tanks for condensing with saline water. Now, by the arrangement here shown for using a portion of the disengaged heat of the exhaust-steam to evaporate the saline water with, and for conveying the vapor thereof into the condenser and condensing it along with the exhaust-steam, I am able to provide for all loss by waste and leakage, and keep the first supply undiminished without additional expense, bulk, or weight.

What I claim as my invention, and desire to secure by Letters Patent, is—

The partition *n* within the tank for the purpose of dividing the water of the evaporator from that of the condenser, in the manner and for the purposes substantially as herein set forth.

EDWARD LYNCH.

In presence of—
ALEX. PORTER BROWNE,
ROBERT W. LAWBER.